United States Patent [19]

Fukuda

[11] Patent Number: 4,697,948
[45] Date of Patent: Oct. 6, 1987

[54] PIVOTAL COUPLING DEVICE

[75] Inventor: Moritoshi Fukuda, Yokohama, Japan

[73] Assignee: Nifco Inc., Yokohama, Japan

[21] Appl. No.: 903,393

[22] Filed: Sep. 3, 1986

[30] Foreign Application Priority Data

Sep. 9, 1985 [JP] Japan .......................... 60-136804[U]

[51] Int. Cl.⁴ .............................................. F16B 9/00
[52] U.S. Cl. ...................................... 403/71; 403/155; 403/163
[58] Field of Search ..................... 403/71, 70, 69, 155, 403/163

[56] References Cited

U.S. PATENT DOCUMENTS 4,352,586 10/1982 Hayden ............................... 403/163

FOREIGN PATENT DOCUMENTS 1278498 10/1961 France ................................. 403/163
1555350 12/1968 France ................................. 403/163

Primary Examiner—Andrew V. Kundrat
Attorney, Agent, or Firm—Trexler, Bushnell, Giangiorgi & Blackstone, Ltd.

[57] ABSTRACT

A device for pivotally coupling together two members. One of the two members to be coupled together is preliminarily provided with a pivot support pin. A cylindrical coupling member provided with a lock member is fitted on the pivot support pin and then it is forcibly inserted through a bearing hole formed in the other one of the two members, whereby the pivot support pin can be rotatably mounted in the bearing hole. To decouple the two coupled members, the coupling member can be removed from the pivot support pin by operating the lock member. The two members thus can be coupled and decoupled very easily.

1 Claim, 4 Drawing Figures

PIVOTAL COUPLING DEVICE

FIELD OF THE INVENTION AND RELATED ART STATEMENT

This invention relates to a pivotal coupling device, with which two members can be coupled together for rotation about a pivot support pin and decoupled from each other, when desired, by a simple operation. Such a pivotal coupling device can be used for the pivot section of an automobile reclining seat back support.

As is well known in the art, two members can be rotatably coupled together using a pivot support pin. This coupling method has extensive applications.

To couple together two plate-like members with this coupling system using a pivot support pin, two plates are formed with respective bearing holes, and the pivot support pin is inserted through these bearing holes. Alternatively, the pivot support pin is preliminarily provided on one of the two members and is inserted through a bearing hole formed in the other member. In either case, it is necessary to provide means for retaining the inserted pivot support pin against detachment. The inserted pivot support pin may be permanently retained by calking the end of the pin projecting from the bearing hole. In this case, however, an operation of calking and also a space for carrying out this operation are necessary. Therefore, this method is not suited for use in an assembling line, particularly when assembling an automobile seat.

To overcome the above drawback, a method of pivotal coupling using a bush as shown in FIG. 1 is used as a method of assembly of the pivot section of an automobile reclining sheet back support. In this method, a pivot support pin 3 having a peripheral annular groove 2 is preliminarily secured to a stationary bracket 1, and a rotary bracket 4 which serves as a mounting piece for the back support is formed with a bearing hole 5, which is somewhat greater in diameter than the support pin 3. A bush 6 made of a synthetic resin, which serves as a bearing, is fitted in the bearing hole 5. The pivot support pin 3 is then inserted through a hole 7 of the bush 6, and then a C-ring 8 is fitted in the annular groove 2, which is located at a portion of the pin 3 projecting from the hole 7, whereby the pin 3 is retained against detachment.

With this prior art method of coupling, the mounting operation is comparatively easy because it merely requires the fitting of the bush, insertion of the pivotal support pin into the bush hole and fitting of the C-ring. However, the disassembling operation is quite cumbersome because the C-ring has to be forcibly removed and this operation has to be done in a back side space, which is undesirable from the point of maintenance and inspection operations.

OBJECT AND SUMMARY OF THE INVENTION

An object of the invention is to provide a device for pivotal coupling, which permits the coupling and decoupling operations to be very readily carried out.

Another object of the invention is to provide a device for pivotal coupling, which permits the mounting and demounting operations to be carried out readily, quickly and reliably from one side.

According to the invention, there is provided a device for pivotally coupling together two members, one of these two members being provided with a pivot support pin having a peripheral annular groove and the other one of the two members having a bearing hole for receiving the pivot support pin therein, which device comprises a cylindrical coupling member fitted on the pivot support pin and a resilient lock member for locking the coupling member against detachment from the pivot support pin, the coupling member having a lock flange provided at one end and an elastic lock pawl formed on the outer periphery, the lock member being ring-like in shape and having an inwardly projecting lock portion, the lock member being fitted on the coupling member such that the lock portion penetrates a window formed in the peripheral wall of the coupling member so that it projects into a bore thereof and is received in the annular groove of the pivot support pin to thereby lock the coupling member against detachment from the pivot support pin, the coupling member being inserted through the bearing hole formed in the other member and mounted therein with the other member clamped between the elastic lock pawl and the lock flange, the two members being thereby rotatably coupled together.

With the pivotal coupling device having the above construction according to the invention, the lock member is first fitted on the coupling member, and then the coupling member with the lock member is fitted in the bearing hole formed on one of the two members such that the member is clamped between the lock pawl and lock flange of the coupling member. Then, the pivot support pin projecting from the other member is inserted into the bore of the coupling member. At this time a lock portion which penetrates a window toward in the peripheral wall of the coupling member and projects into the bore thereof is first outwardly forced against the spring force by the pivot support pin, but it is eventually received in the annular groove of the pivot support pin. The pivot support pin is thus locked against detachment from the coupling member while it is rotatable therein. Further, when the lock member is deformed by inwardly pushing its opposite ends in this state, so that the lock portion retracts from the bore of the coupling member, the pivot support pin is no longer retained so that it can be removed from the coupling member while the coupling member is left in the bearing hole.

When the pivot support pin is taken out, the lock member restores to its initial shape, with its lock portion projecting into the bore of the coupling member to be again ready for the insertion of the pivot support pin into the coupling member.

The above and other objects and features of the invention will become more apparent from the following description when the same is read with reference to the accompanying drawings.

DETAILED DESCRIPTION OF THE PREFERRED EMBODIMENT

Figure 1:
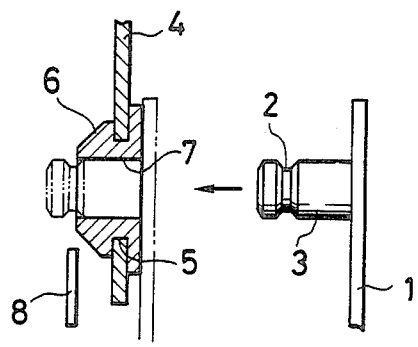
FIG. 1 is a view showing a prior art pivotal coupling device using a bush.
Figure 3:
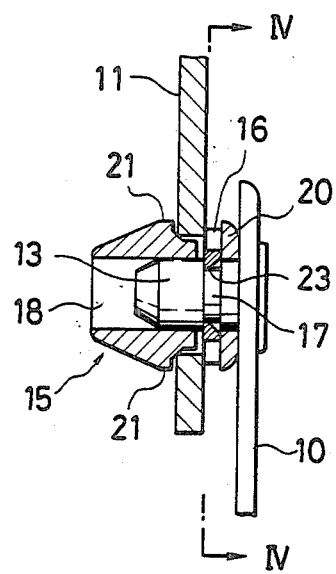
FIG. 3 is a sectional view showing the pivotal coupling device shown in FIG. 2 in a pivotally coupled state.
Figure 4:
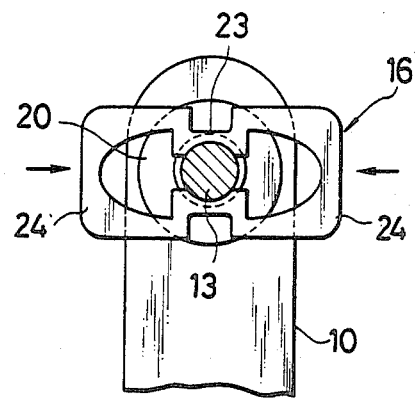
FIG. 4 is a sectional view taken along line IV—IV in FIG. 3.
Figure 2:
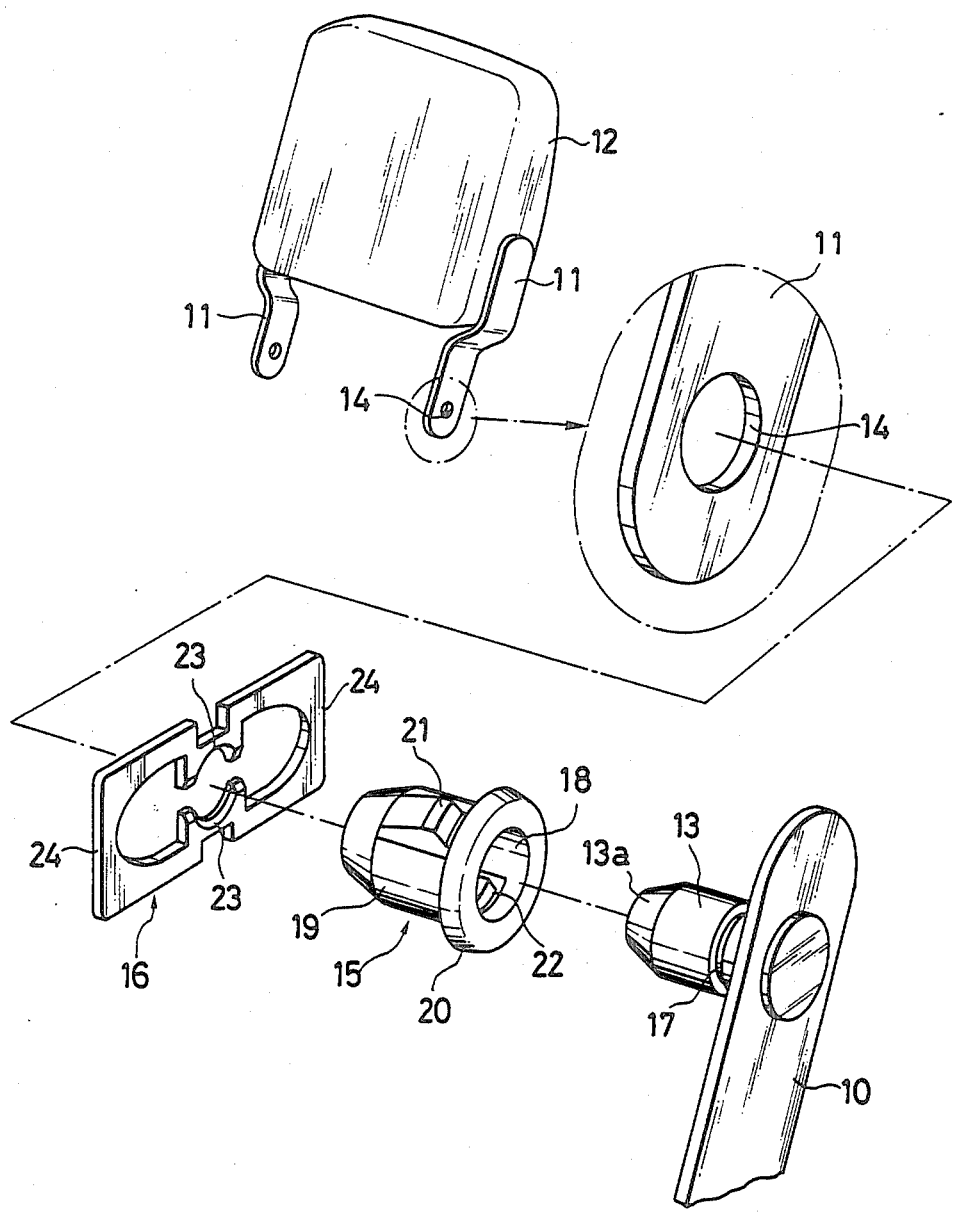
FIG. 2 is an exploded perspective view with essential parts shown to an enlarged scale, illustrating an embodiment of the pivotal coupling device according to the invention.

FIGS. 2 to 4 show an embodiment of the pivotal coupling device according to the invention applied to pivotally mount an automobile reclining sheet back support. Referring to the Figures, reference numeral 10 designates a stationary seat mounting member and numeral 11 a coupling arm of a back support 12 which is to be pivotally mounted. The coupling arm 11 has a bearing hole 14 for receiving a pivot support pin 13 which is secured to the mounting member 10. Reference numeral 15 designates a cylindrical coupling member for rotatably supporting the pivotal support pin 13 accommodated in the bearing hole 14. Reference numeral 16 designates a lock member for locking the pivot support pin 13 against detachment from the coupling member 15.

The pivot support pin 13 projects perpendicularly form the inner surface of the mounting member 10. It is formed in an intermediate portion with an annular groove 17 in which the lock member 16 is received as will be described hereinafter. It also has a tapered end portion 13a. The bearing hole 14, which receives the pivot support pin 13, is given a greater diameter than the pin 13 because it also receives the coupling member 15.

The coupling member 15 is made of synthetic resin and has a hollow cylindrical portion 19 having a bore 18 and a lock flange 20 provided at one end of the cylindrical portion 19. The outer periphery of the cylindrical portion 19 is provided with a pair of diametrically opposite elastic lock pawls 21. The elastic lock pawls 21 face and are spaced apart a predetermined distance from the lock flange 20. Portions of the cylindrical portion 19 between the lock pawls 21 and the lock flange 20 are formed with diametrically opposed windows 22.

The lock member 16 is made of a resilient metal. In this embodiment, it consists of a rectangular sheet having a substantially oval opening so that it is ring-like in shape. Its longitudinally intermediate opposed portions have inwardly extending channel-like portions. The facing sides of the two channel-like portions are formed with arcuate lock portions 23.

The lock member 16 can be outwardly flexed by inwardly urging its opposite ends 24 with the fingers, whereby the lock portions 23 are displaced away from each other.

The lock member 16 is fitted on the coupling member 15 to restrict and retain the pivot support pin 13 inserted into the bore 18. In its outwardly flexed state, the lock member 16 is inserted around the coupling member 15, and when the lock portions 23 are brought to the position of the windows 22, the lock member 16 restores to its original shape, whereby the lock portions 23 are received in the windows 22 to complete the fitting of the lock member 16. In this state, the lock portions 23 project into the bore 18 to produce a substantially constricted portion in the bore.

With the pivotal coupling device having the above construction according to the invention, the lock member 16 is first fitted on the coupling member 15, and then the coupling member 15 is forcibly inserted through the bearing hole 14 from the outer side of the coupling arm 11. Thus, the elastic lock pawls 21 are engaged with the inner surface of the coupling arm 11. Also, the lock member 16 is engaged with the outer surface of the coupling arm 11. In this way, the coupling member 15 with the lock member 16 is installed in the bearing hole 14. Thereafter, the pivot support pin 13 secured to the mounting member 10 is inserted through the bore 18 of the coupling member 15. As the pin 13 is inserted into the bore 18, the lock portions 23 projecting into the bore 18 are once outwardly retracted but are eventually received in the annular groove 17. Thus, the pivot support pin 13 is retained in the coupling member 15 against detachment.

It is to be understood that the stationary mounting member 10 and coupling arm 11 are pivotally coupled together by fitting the coupling member 15 with the lock member 16 in the bearing hole 14 and then inserting the pivot support pin 13 into the coupling member 15. The pivot support pin 13 can be removed with the coupling member 15 retained in the bearing hole 14 by outwardly displacing the lock portions 23 of the lock member by inwardly urging the ends 24 thereof.

As has been described in the foregoing, according to the invention two members can be pivotally coupled together by an operation of forcibly fitting the coupling member in a bearing hole formed in one of the members, e.g. a coupling arm, and an operation of inserting a pivot support pin projecting from the other member, e.g. a stationary mounting member, in the bore of the coupling member. In this case, the pivot support pin can be freely rotated about its axis of rotation. Further, the two members pivotally coupled together can be decoupled by urging the lock member provided on the coupling member. After such decoupling the two members can be coupled together again. Thus, far superior effects can be obtained than with the prior art device.

Further, with the device according to the invention, the operation of mounting the coupling member in the bearing hole and the operation of inserting the pivot support pin in the coupling member for coupling together the two members can all be done from the outer side. The coupling operation thus can be carried out very easily and efficiently. Further, the two members coupled together can be decoupled by manipulating the lock member which is positioned on the outer side of one member, i.e. the mounting arm. Thus, this operation can also be carried out easily without need of inserting the hand into a narrow space.

What is claimed is:

1. A device for pivotally coupling together two members, one of said two members being provided with a pivot support pin having a peripheral annular groove and the other one of said two members having a bearing hole for receiving said pivot support pin therein, said device comprising a cylindrical coupling member fitted on said pivot support pin and a resilient and flexible lock member for releasably locking said coupling member against detachment from said pivot support pin, said coupling member having a lock flange provided at one end and an elastic lock pawl formed on the outer periphery, said lock member being of elongated ring-like shape and having opposite end portions joined by intermediate portions and an inwardly projecting lock portion on at least one of said intermediate portions, said lock member being fitted on said coupling member such that said portions penetrate a window formed in the peripheral wall of said coupling member so that they project into a bore thereof and are received in said annular groove of said pivot support pin thereby releasably locking said coupling member against detachment from said pivot support pin, said locking member being resiliently deflected upon pressing said opposite end portions together to disengage said locking projection from said groove said coupling member being inserted through said bearing hole formed in said other member and mounted therein with said other member clamped between said elastic lock pawl and said lock flange, said two members being thereby releasably rotatably coupled together.

* * * * *